United States Patent [19]

Astrom et al.

[11] 4,454,034
[45] Jun. 12, 1984

[54] FILTER APPARATUS

[75] Inventors: Gordon L. Astrom, Mount Morris; Mark A. Herbig, Roscoe, both of Ill.

[73] Assignee: Aqua-Aerobic Systems, Inc., Rockford, Ill.

[21] Appl. No.: 496,092

[22] Filed: May 19, 1983

[51] Int. Cl.³ .............................................. B01D 23/24
[52] U.S. Cl. ..................................... 210/108; 210/196; 210/264; 210/275
[58] Field of Search .................. 55/242; 210/108, 196, 210/197, 269, 270, 271, 273, 275, 276, 278, 280, 292, 409, 411, 539, 111, 138, 142, 264

[56] References Cited

U.S. PATENT DOCUMENTS

| | | | |
|---|---|---|---|
| 2,302,449 | 11/1942 | Laughlin | 210/273 |
| 2,302,450 | 11/1942 | Laughlin | 210/264 |
| 2,826,306 | 3/1958 | Burns | 210/539 X |
| 3,239,061 | 3/1966 | Horning et al. | 210/774 |
| 3,984,326 | 10/1976 | Bendel | 210/273 X |
| 4,133,766 | 1/1979 | Adie | 210/275 |
| 4,152,265 | 5/1979 | Meyers | 210/273 |
| 4,333,839 | 6/1982 | Cardoza et al. | 210/411 X |

Primary Examiner—Peter A. Hruskoci
Assistant Examiner—W. Gary Jones
Attorney, Agent, or Firm—Vernon J. Pillote

[57] ABSTRACT

A filter apparatus in which a generally horizontal bed of filter material is supported on a porous support and is divided by spaced partitions into individual filter cells above the support and individual filter compartments below the support, and a carriage is mounted for movement along the filter bed and has an waste water pump and collector hood that moves along the top of the bed to collect backwash effluent therefrom and direct it to a waste water trough, and a backwash pump and backwash head arranged to direct backwash fluid into the compartments below the porous support. A flow measuring weir is associated with the waste water trough and the backwash pump is arranged so that its output can be selectively delivered to the waste water trough whereby the flow measuring weir can be used to measure both backwash and waste water flow rates.

6 Claims, 5 Drawing Figures

FILTER APPARATUS

BACKGROUND OF THE INVENTION

It has heretofore been proposed, for example, as shown in U.S. Pat. Nos. 2,302,449; 2,302,450; 3,239,061 and 4,152,265 to make a filter apparatus in which the filter bed is supported on a generally horizontal porous support in a tank and partitions provided at spaced locations along the tank to separate the bed into a plurality of filter cells above the porous support and to divide the space below the porous support into a plurality of filtrate compartments that communicate at one end through a filtrate port with a filtrate launder that extends along the length of the tank. In such filter apparatus, the fluid to be filtered is supplied to the tank above the bed of filter material and passes downwardly through the bed of filter material into the filtrate compartments and out of the filtrate compartments into the filtrate launder to a discharge outlet. The bed of filter material is progressively cleaned by a carriage mounted for movement along the bed and having a backwash head movable through the filtrate launder sequentially into communication with the filtrate ports to supply backwash fluid to the filtrate compartments at the underside of the porous support and a collector hood movable along a path over the top of the beds to collect the backwash effluent. Backwash water is supplied to the backwash head by a backwash pump and a waste water pump is connected to the collector hood for pumping waste water from the hood into a waste water trough.

In order to obtain efficient cleaning of the bed it is desirable to adjust the backwash to a flow rate which will loosen the slit and solids in the bed without causing removal of filter media. It is also desirable to adjust the effluent flow rate from the hood in relation to the backwash flow rate. If the effluent flow rate is too low, the backwash water tends to blow the silt and solids out of the hood and into the tank. On the other hand, if the effluent flow rate is too high, excessive water is withdrawn from the tank above the bed and passed to drain with the waste water. This adjustment of the backwash and effluent flow rates is desirable not only at the time of installation of the filter, but also periodically after installation to compensate for variation in the delivery of one or the other of the pumps as may be caused, for example by wear in the pump or by debris accumulation in the pumps and conduits. Measurement and proper adjustment of the backwash and effluent flow rates has presented a continuing problem in the field.

SUMMARY OF THE INVENTION

The present invention relates to filter apparatus of the type in which a bed of filter material is supported on a generally horizontal porous support and a backwash apparatus is moved along the bed to progressively backwash and clean the same. The backwash apparatus includes a backwash head arranged to supply backwash fluid to the underside of the filter bed and a collector hood which is movable over the surface of the bed to collect backwash therefrom. It is an object of the present invention to provide an improved arrangement for measuring the rate of flow of backwash fluid to the bed and waste water fluid from the hood to facilitate adjustment of the flow rates.

Accordingly, the present invention provides a filtering apparatus of the type including a tank, a carriage movable along a carriage path over the tank, porous means defining a filter bed support having a bed of filter material thereon, a plurality of partitions extending transverse to the carriage path and spaced apart therealong defining a plurality of fluid receiving compartments below the filter bed, a plurality of filtrate ports spaced apart along a port locus paralleling said carriage path with each filtrate port communicating with a respective one of the fluid receiving compartments, a filtered fluid launder extending along said port locus and communicating with said filtrate ports, backwash means carried by said carriage and including a backwash pump and a backwash head movable along a path paralleling said port locus sequentially into juxtaposition with each of said filtrate ports to supply backwash fluid thereto, a waste water trough extending lengthwise of said tank, a collector hood carried by said carriage for movement therewith along a path adjacent the upper surface of the bed, an waste water pump connected to the collector hood for pumping waste water therefrom and for delivering the waste water into the waste water trough, selectively operable means for delivering fluid from the backwash pump either to the backwash head or to the waste water trough, weir means associated with the waste water trough adapted to measure the rate at which fluid is delivered to the waste water trough from the backwash pump and from the waste water pump, and means for adjusting the rate at which the waste water pump delivers waste water and/or the backwash pump delivers effluent to the waste water trough.

These, together with other objects and advantages of this invention will be more readily apparent from the following description when taken in connection with the accompanying drawings wherein.

Figure 1:
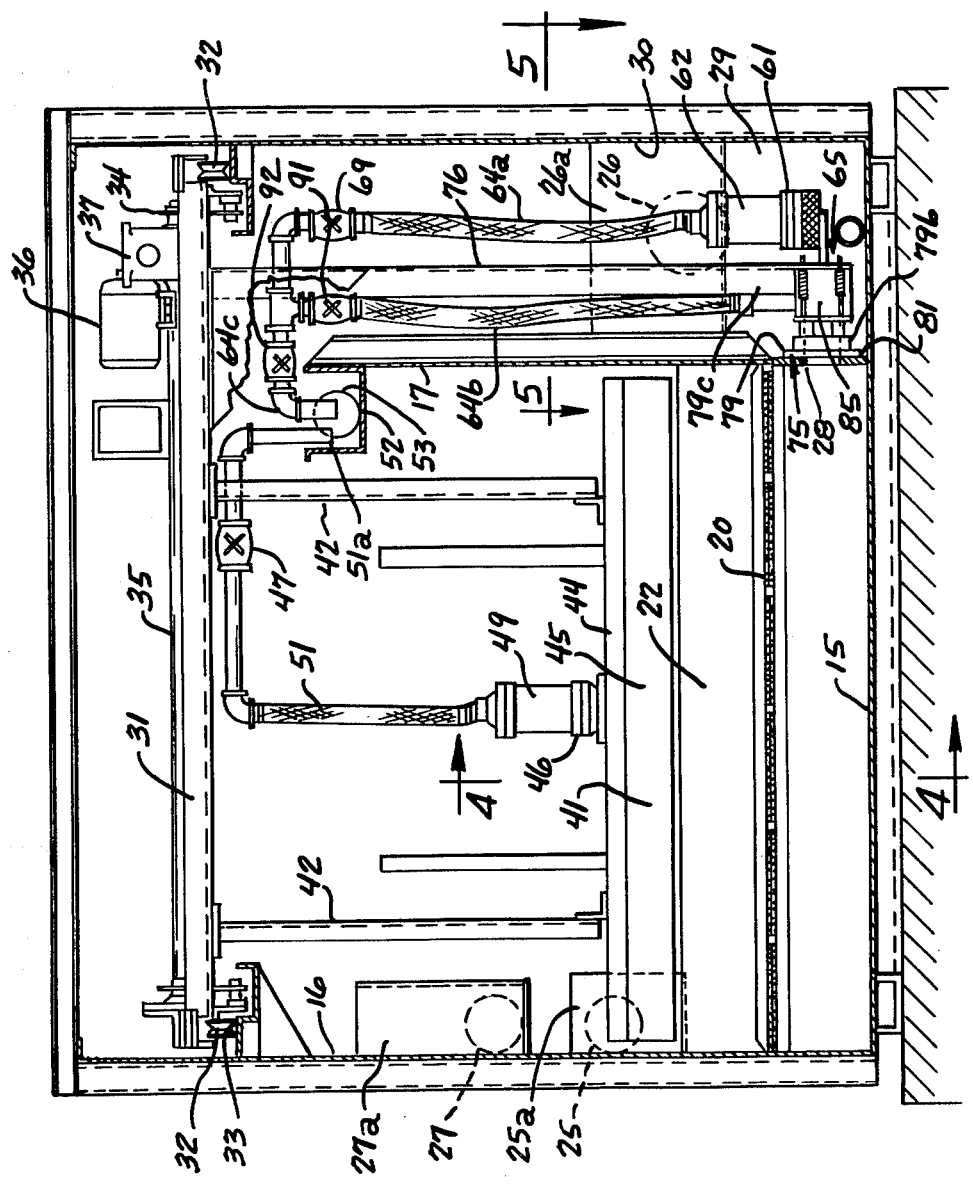
FIG. 1 is a transverse vertical sectional view through a filter apparatus embodying the present invention.

The filter apparatus in general includes an elongated tank, conveniently of rectangular configuration and including a bottom wall 15, spaced sidewalls 16 and 17, and end walls 18. A bed of particulate filter material 19 is supported on a generally horizontal porous support 20 in the tank and generally upright partitions 22 extend crosswise of the lower portion of the tank between the sidewalls and separate the bed 19 into filter cells 23 above the porous support 20 and filtrate compartments 24 below the porous support. The porous support is conveniently in the form of porous slabs disposed between the partitions and supported thereon as by brackets 22a. The water or other fluid to be filtered is supplied through a pipe which communicates with the tank through an inlet port 25 at a level above the bed of filter material to supply the fluid to be filtered thereto and a baffle plate 25a overlies the inlet port 25. The fluid passes downwardly through the filter bed and through the porous support 20 and into the filtrate compartment 24 below the porous support and the filtrate then flows along the compartments 24 crosswise of the tank and through filtrate outlet ports 28 into a filtrate launder 29

(FIG. 1) formed between the outer wall 30 and the sidewall 17 of the tank. An overflow outlet 27 is provided in the tank at a level above the inlet port 25 and an upwardly opening baffle 27a overlies the outlet 27 and is arranged to pass water from the tank to the overflow outlet when the liquid level reaches the top of the baffle 27a. A filtered water outlet 26 communicates with the filtered fluid launder 29 and a baffle 26a overlies the filtered water outlet and forms a weir to maintain the liquid level in the launder at a level above the top of the bed and below the level of the liquid in the tank.

Figure 2:
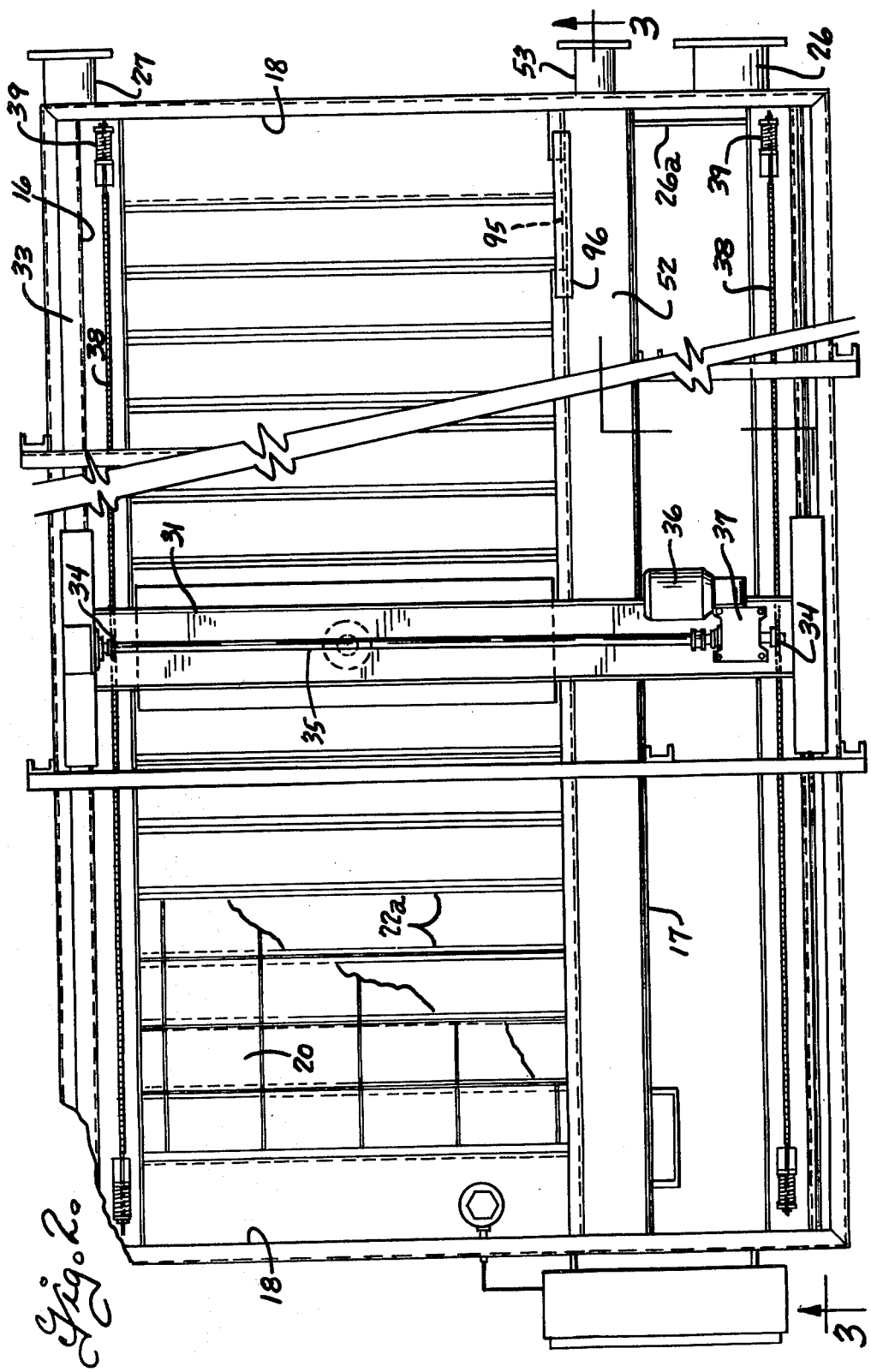
FIG. 2 is a top plan view of the filter apparatus.
Figure 3:
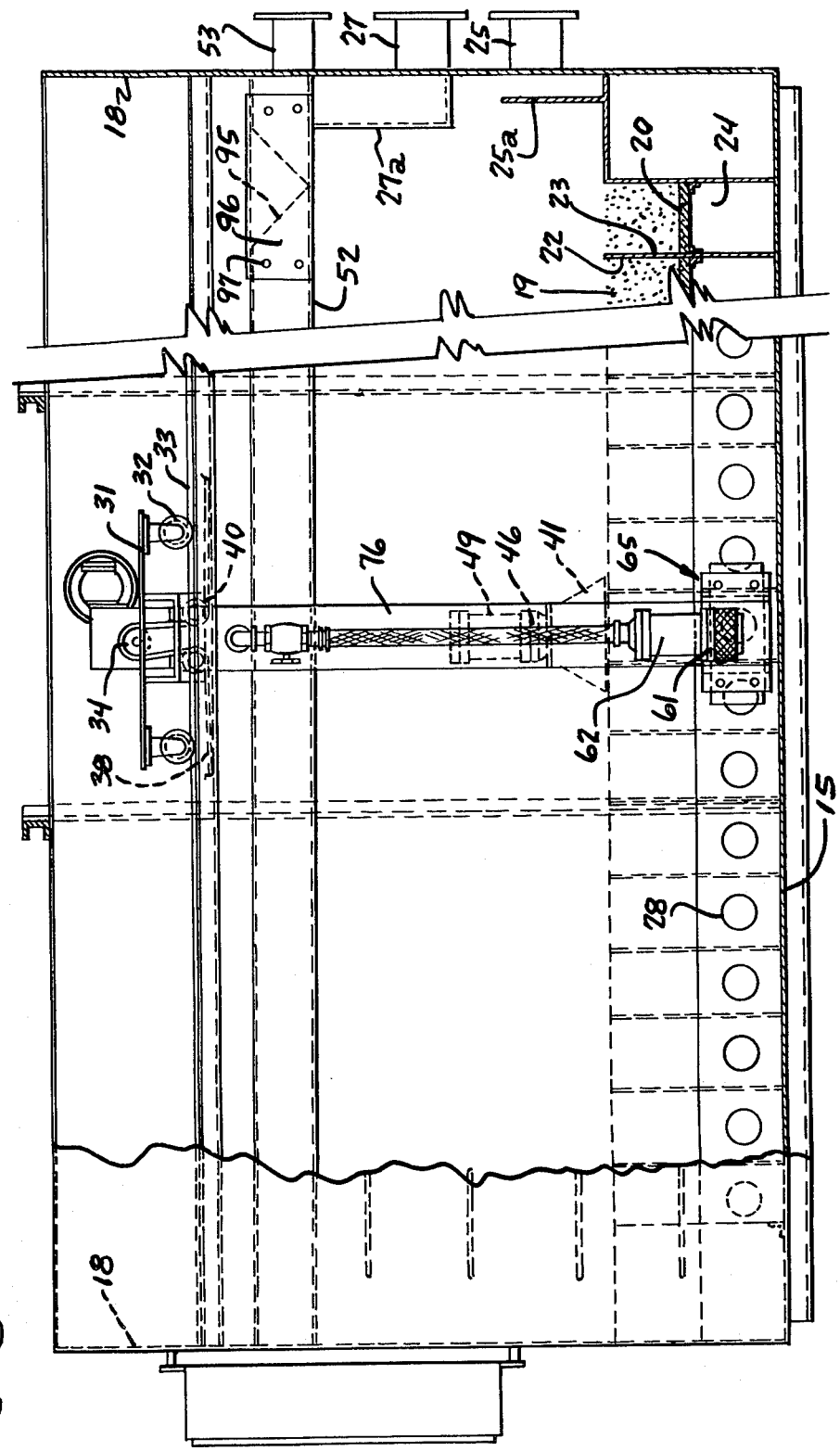
FIG. 3 is a vertical sectional view taken on the plane 3—3 of FIG. 2.

The filtrate cells 23 are progressively backwashed by a backwash apparatus carried by a bridge or carriage 31 and supported by flanged wheels 32 on a track 33 for movement along a generally horizontal carriage path lengthwise of the tank. The carriage 31 is reversibly driven along the track by drive sprockets 34 non-rotatably keyed to opposite ends of shaft 35. The shaft 35 is reversibly driven by a motor 36 through a speed reducing drive 37, and the sprockets 34 mesh with chains 38. As best shown in FIGS. 2 and 3, the ends of the chains 38 are anchored by resilient anchors 39 on the tank and the chains are looped intermediate their ends under idler sprockets 40 and over drive sprockets 34 to propel the carriage along the tracks when the drive sprockets 34 are driven. The other ends of the chains are connected to adjustable anchors 39a which enable lengthwise adjustment of the chains to square the carriage relation to the tank.

Figure 4:
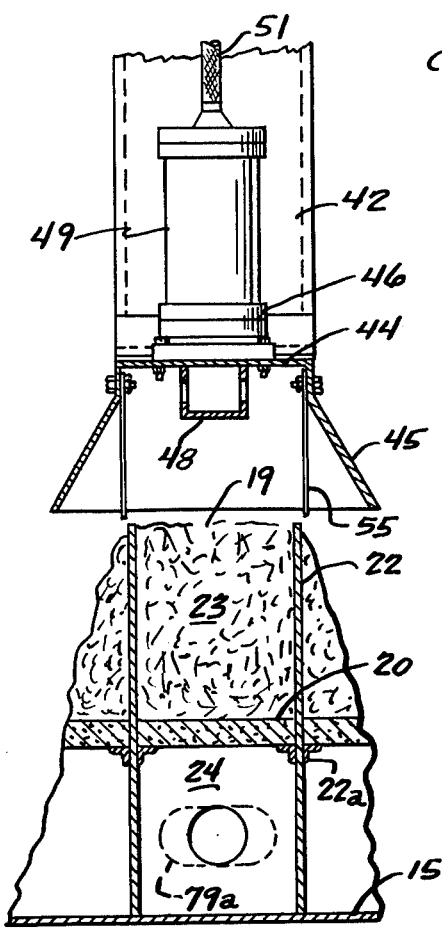
FIG. 4 is a fragmentary vertical sectional view taken on the plane 4—4 of FIG. 1 and illustrating the parts on a larger scale.

The backwash apparatus includes a collector hood 41 suspended from the carriage 31 as by support members 42, for movement along a path closely adjacent the upper surface of the filter bed 23. As shown in FIG. 1, the collector hood 41 has a length measured crosswise of the path of travel of the carriage which is only slightly less than the spacing between the sidewalls 16 and 17 of the tank to span the width of the tank, and the hood is positioned to extend closely adjacent the surface of the bed. As shown in FIGS. 1 and 4, the hood comprises a channel-shaped member 44 and spaced hood members 45 that extend downwardly from the channel-shaped member and terminate with their lower edges closely adjacent the surface of the bed and spaced apart a distance substantially greater than the spacing of the partitions 22 and preferably of the order of about one and one-half times the spacing of the cell partitions. A waste water pump 46 (FIGS. 1 and 4) is mounted on the collector hood and has its inlet connected to a distributor pipe 48 (FIG. 4) in the hood, which distributor pipe extends substantially the length of the hood with openings spaced apart therealong to more evenly distribute withdrawal of fluid along the length of the collector hood. The waste water pump 46 is driven as by a motor 49 and has its discharge outlet connected through a discharge pipe 51 which is arranged to have its outlet end 51a discharge into a waste water trough 52 that extends the length of the tank. Water from the waste water trough 52 flows to a waste water outlet 53 and may be passed to waste or subjected to further treatment if desired. The waste water pump is preferably of the centrifugal type and the motor 46, is preferably of the submersible type so that the motor and pump can be mounted as a unit on the hood below the liquid in the tank to avoid any problem with priming of the pump. A means such as a manually adjustable valve 47 is provided in the discharge pipe 51 to enable adjustment of the rate of flow of effluent from the hood.

A substantial portion of the material in the fluid being filtered deposits on the surface of the bed and forms a relatively dense mat. Scarifying means 55 (FIG. 4) are provided in the hood to break up and loosen the mat on the surface of the bed. The scarifying means may, for example, be of the type disclosed in U.S. Pat. No. 4,152,265.

Figure 5:
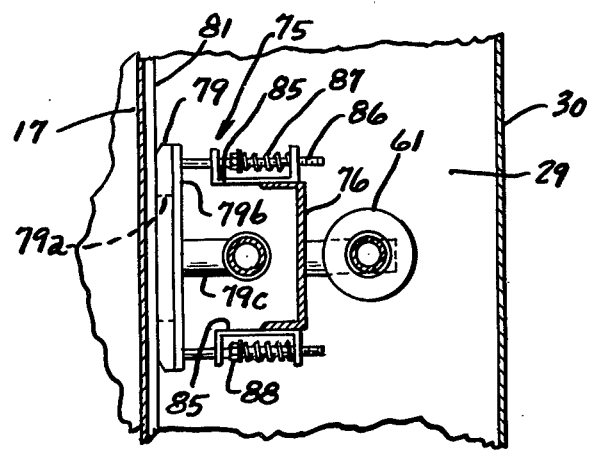
FIG. 5 is a fragmentary horizontal sectional view taken on the plane 5—5 of FIG. 1.

A backwash head 65 is attached to one end of the carriage for movement therewith and, as best shown in FIGS. 1, 3 and 5, a rigid arm 76 is attached at its upper end to one end of the carriage 31 and extends downwardly into the filtrate launder 29 to a level adjacent the filtrate ports 28. The backwash head includes a shoe 79 adapted to slidably engage a guide plate 81 having the filtrate ports 28 at spaced locations therealong each registering with one of the filtrate compartments 24. The guide plate 81 can be in the form of a heavy metal plate, as shown in FIGS. 4 and 5, the shoe 79 has an elongated opening 79a therein which is adapted to move into and out of registy with the filtrate ports 28. A housing including a plate 79b and a pipe elbow 79c forms a chamber in the backwash head that communicates with the opening 79a, and the chamber is connected to a backwash delivery conduit. The head 65 is resiliently biased laterally of the arm 76 against the guide plate 81. As best shown in FIGS. 1, 3 and 5, the arm 76 has channel members 85 at its lower end spaced apart in a direction paralleling the path of travel of the carriage. A means such as guide pins 86 are attached to the head 65 and slidably extend through openings in the flanges on the channel members to support the shoe for limited movement in a direction laterally of the support arm 76. Springs 87 are interposed between one of the flanges on the channel members 85 and a stop 88 on the rods 86 to yieldably urge the shoe into engagement with the guide plate 81. The filtrate ports are centered relative to their respective filter cell 23 and the center-to-center spacing of the filtrate ports 28 therefore correspond to the width of the filter cells.

The opening 79a in the backwash shoe preferably has a length corresponding to the center-to-center spacing of the filtrate ports 28, that is to the width of the filter cells 23, and the filtrate ports preferably have a diameter corresponding to one-half the cell width and are spaced apart a distance equal to one-half the cell width. With this arrangement, the elongated opening 79a in the shoe will start to cut off flow to the filtrate port of one cell at about the same time it starts to introduce backwash fluid into the filtrate port associated with the next succeeding cell and, when the opening 79a moves into full communication with the filtrate port in the next succeeding cell, it shuts off communication to the filtrate port of the preceding cell. The opening 79a remains in full communication with the filtrate port associated with each cell while the carriage travels a distance approximately equal to one-half the cell width, before it begins to communicate with the filtrate port associated with a succeeding cell. Thus, a full backwash flow is supplied to each cell while the carriage moves a distance corresponding to approximately one-half the cell width and the flow to that cell is thereafter gradually cut off while flow to the next succeeding cell is initiated.

Backwash water is supplied to the backwash head 75 by a backwash pump 61 driven by a motor 62. The backwash pump is preferably of the centrifugal type and the motor 62 is preferably of the submersible type so that the motor and pump can be mounted as a unit on the lower end of the arm 76 for movement with the carriage. The backwash pump has its inlet communicating with the filtered fluid launder 29 to receive water therefrom. The outlet of the backwash pump is connected through a delivery conduit 64a, 64b to the backwash head 75 to supply backwash fluid thereto during backwashing.

In accordance with the present invention, a flow measuring device is provided in the filter apparatus and arranged for selective use in measuring the flow from the backwash pump 61 and from the effluent pump 46 to facilitate proper adjustment of the backwash and effluent flow rates. As best shown in FIG. 1, delivery conduit sections 64a and 64b are connected at their upper ends to a conduit section 64c having its outlet end arranged to a discharge into the waste water trough. A manually adjustable flow control valve 69 is provided in conduit section 64a to enable adjustment of the backwash flow rate and shut-off means 91 and 92 are provided in conduit sections 64b and 64c to enable backwash flow to be selectively diverted to either the backwash head or to the waste water trough. Thus, when shut-off means 92 is closed and shut-off means 91 is opened, the backwash pump will deliver fluid through conduit section 64b to the discharge head 75 and, when shut-off means 92 is open and shut-off means 91 is closed, the backwash pump will deliver its output to the waste water trough 52. Adjustment of flow is controlled by valve 69 adjusting the rate of flow from the backwash pump to either conduit section 64b or 64c.

A flow measuring weir is associated with the filtering apparatus for use in measuring the rate at which fluid is delivered by the backwash pump and the waste water pump. The weir is located on the filter apparatus and arranged so that a single weir can be used to selectively measure the rate of flow from the backwash pump and the rate of flow from the waste water pump to facilitate correlation of the rate of flow of waste water from the collector hood with the backwash flow rate. In the preferred embodiment illustrated, the weir is arranged in the trough so that water from the trough flows through the weir back to the tank. The waste water trough is mounted inside the tank and the weir is conveniently in the form of a notch 95 formed in the side of the waste water trough. The weir can be of the V-type or of any other suitable type. A cover plate 96 is removably attached to the trough as by fasteners 97 to normally cover the weir and prevent flow therethrough. When it is desired to measure the rate at which water is delivered to the trough, the weir cover plate 96 is removed and a plug or cover (not shown) is installed into the waste outlet 53 to block flow to the waste outlet so that water delivered to the trough flows from the trough back to the tank.

As is well understood, the rate of flow through a weir can be determined from the weir configuration and the height of the flow crest over the base of the weir, using tables or formulas. However, since the same weir is used for measuring both the backwash flow rate and the waste water flow rate, it is not necessary to calculate or use tables to determine the actual backwash and waste water flow rates. Instead the weir can be provided with calibration marks to directly indicate the flow rates therethrough, and the backwash and waste water flow rates could be then adjusted to correspond to flow rates that have been predetermined for the size of the filter cells and the type of filter bed material therein. Alternatively, the skilled filter operator can adjust the backwash flow using valve 69, the proper backwash rate by visual observation of the effect of the backwash flow on the bed. If the backwash rate is too low, it will not lift the debris and scum from the filter bed and, if too high, it will cause excessive lifting of the bed to a degree that bed attrition will occur. When the desired backwash rate is reached, the shut-off means 91 can be closed and the shut-off means 92 opened to deliver the backwash flow to the waste water trough for measurement by the weir. Thereafter, the backwash flow can be again directed to the backwash head and the waste water pump turned on and the waste water flow rate then measured. The waste water flow rate is adjusted by valve 47 to a rate at least equal to and preferably slightly higher than the previously measured backwash rate. The waste water flow rate should at least equal the backwash rate to prevent the backwash flow from blowing debris from the filter cell being cleaned back to the tank, and the waste water flow rate should not substantially exceed the backwash flow rate to avoid excessive withdrawal of water from above the filter bed and passing the same to drain. As will be apparent, this procedure does not require determination of the actual backwash flow rate in g.p.m. but only the height of the water crest at the weir when the desired backwash flow is delivered to the waste water trough. The waste water flow rate can then be adjusted to provide the same or a preferably slightly higher flow crest. As will be apparent, the backwash and waste water flow measurements can be made with the carriage at any location along the tank and even when the carriage is moving along the tank. The arrangement in which a single weir is used to selectively measure the rate of flow from the backwash pump and the rate of flow from the waste water pump facilitates adjustment of the flow relationship of the waste water pump and the backwash pump flow. In addition, the use of a single flow measuring weir to measure both backwash and waste water flows avoids some of the flow measuring errors that would occur if two separate flow measuring devices were used at two different locations to separately measure backwash flow and waste water flow.

The carriage 31 is driven by motor 36 along the length of the tank and means (not shown) is provided for reversing the motor drive at each end of the tank to reverse the direction of movement of the carriage. The carriage can be operated in continuous fashion from one end of the tank to the other, or it can be operated intermittently under the control of a timer or under the control of mechanism responsive to the condition of the bed, or both. For example, as disclosed in U.S. Pat. No. 4,152,265 it is common practice to provide a means such as a first liquid level sensing probe which senses when the bed is contaminated to a predetermined degree, as indicated by a predetermined rise in the liquid level of the tank, to start the travel of the backwash carriage and operation of the backwashing apparatus, with a second liquid level sensing probe arranged to sense when the bed has been cleaned to the desired degree, as indicated by a drop in the liquid level in the tank. A third probe is commonly provided to sense if the liquid level has dropped to an excessively low level and to operate apparatus to shut off the backwashing under that condition. If it is desired to stop the carriage at a predetermined point along the tank, additional controls can be provided for this purpose. In addition, suitable electric controls are provided to make selective operation of the backwash and waste water pumps during adjustment of the backwash and waste water flow rates.

The embodiments of the invention in which an exclusive property is claimed are defined as follows:

1. A filtering apparatus of the type including a tank, a carriage movable along a carriage path over the tank, porous means defining a filter bed support having a bed of filter material thereon, a plurality of partitions extending transverse to the carriage path and spaced apart therealong defining a plurality of fluid receiving compartments below the porous means, a plurality of filtrate ports spaced apart along a port locus paralleling said carriage path with each filtrate port communicating with a respective one of the fluid receiving compartments, a water inlet communicating with the tank above the bed of filter material, means for limiting the upper liquid level in the tank to a predetermined upper level below the top of the tank, a filtered fluid launder extending along said port locus and communicating with said filtrate ports, a filtered water outlet communicating with the filtrate launder, means controlling flow to the filtered water outlet for maintaining a minimum liquid level in the launder that is above the top of the bed of filter material and below said predetermined upper level in the tank, backwash means carried by said carriage and including a backwash pump and a backwash head movable along a path paralleling said port locus sequentially into juxtaposition with each of said filtrate ports to supply backwash fluid thereto, a waste water outlet, a waste water trough extending lengthwise of said tank and communicating with the waste water outlet, flow measuring notch type weir means associated with said apparatus for measuring flows at rates corresponding to a desired backwash rate and having an inlet side and a discharge side, a collector hood carried by said carriage for movement therewith along a path adjacent the upper surface of the bed, a waste water pump connected to the collector hood for pumping waste water therefrom, waste water conduit means connected to the waste water pump and having an outlet for delivering the waste water into said waste water trough, backwash conduit means for delivering fluid from the backwash pump to the backwash head, adjustable backwash flow control means in said backwash conduit means for adjusting the rate of flow of fluid therethrough from a backwash pump to the backwash head to the desired backwash rate, means including valve means connected to the backwash conduit means between said backwash flow control means and said backwash head for selectively shutting off flow from the backwash pump to the backwash head and for delivering flow from the backwash pump to the inlet side of the weir means for measurement of the rate of flow from the backwash pump through the backwash flow control means, adjustable waste water flow control means in the waste water conduit means for adjusting the rate of flow of fluid therethrough, and means for selectively shutting off flow of fluid from the waste water conduit means to the waste water outlet and for delivering fluid from the waste water conduit means to the inlet side of the weir means for measurement of the rate of flow of fluid from the waste water pump through the waste water flow control means.

2. A filtering apparatus according to claim 1 wherein said weir means is arranged to pass fluid back to said tank.

3. A filtering apparatus of the type including a tank, a carriage movable along a carriage path over the tank, porous means defining a filter bed support having a bed of filter material thereon, a plurality of partitions extending transverse to the carriage path and spaced apart therealong defining a plurality of fluid receiving compartments below the porous means, a plurality of filtrate ports spaced apart along a port locus paralleling said carriage path with each filtrate port communicating with a respective one of the fluid receiving compartments, a water inlet communicating with the tank above the bed of filter material, means limiting the upper liquid level in the tank to a predetermined upper level that is below the top of the tank, a filtered fluid launder extending along said port locus and communicating with said filtrate ports, a filtered water outlet communicating with the filtrate launder, means controlling flow to the filtered water outlet for maintaining a minimum liquid level in the launder that is above the top of the bed of filter material and below said predetermined upper level in the tank, backwash means carried by said carriage and including a backwash pump and a backwash head movable along a path paralleling said port locus sequentially into juxtaposition with each of said filtrate ports to supply backwash fluid thereto, a waste water outlet, a waste water trough extending lengthwise of said tank at a level above said predetermined upper level in the tank and communicating with the waste water outlet, a collector hood carried by said carriage for movement therewith along a path adjacent the upper surface of the bed, a waste water pump connected to the collector hood for pumping waste water therefrom, waste water conduit means connected to the waste water pump, for delivering the waste water into said waste water trough, adjustable waste water flow control means in the waste water conduit means for adjusting the rate of flow of fluid therethrough, backwash conduit means for delivering fluid from the backwash pump to the backwash head, adjustable backwash flow control means in said backwash conduit means for adjusting the rate of flow of fluid therethrough from the backwash pump to the backwash head to a desired backwash rate, means including valve means connected to the backwash conduit means between said backwash flow control means and said backwash head for selectively shutting off flow from the backwash pump to the backwash head and for delivering flow from the backwash pump to the waste water trough, a flow measuring notch type weir means associated with the waste water trough for measuring flows at rates corresponding to a desired backwash rate, said weir means having an inlet side and a discharge side, and means for selectively interrupting flow of fluid from the trough to the waste water outlet and for passing fluid from the trough through the weir means to measure the rate at which fluid is delivered to the waste water trough from either the backwash pump or the waste water pump.

4. A filtering apparatus according to claim 3 wherein said weir means is arranged to pass fluid from the waste water trough back to said tank, and cover means for selectively blocking flow through the weir means.

5. A filtering apparatus according to claim 3 wherein said waste water trough is located inside the tank, said weir means comprising a weir notch in the side of the trough arranged to discharge fluid back into the tank, and cover means for selectively blocking flow through the weir means.

6. A filtering apparatus according to claim 5 wherein the trough is located adjacent the filtered fluid launder.

* * * * *